United States Patent [19]

Bodford et al.

[11] Patent Number: 5,589,249
[45] Date of Patent: Dec. 31, 1996

[54] MEDICAL COMPOSITE WITH DISCONTINUOUS ADHESIVE STRUCTURE

[75] Inventors: Carl A. Bodford, Charlottesville; Stephen O. Chester, Staunton; Rahul K. Nayak, Waynesboro, all of Va.

[73] Assignee: Poly-Bond, Inc., Waynesboro, Va.

[21] Appl. No.: 504,066

[22] Filed: Jul. 18, 1995

Related U.S. Application Data

[60] Continuation-in-part of Ser. No. 389,029, Feb. 15, 1995, which is a division of Ser. No. 220,671, Mar. 31, 1994, abandoned, which is a division of Ser. No. 2,421, Jan. 8, 1993, Pat. No. 5,342,469.

[51] Int. Cl.$^6$ .............................. B32B 3/00; B32B 7/06; B32B 7/10
[52] U.S. Cl. ........................ 428/200; 428/198; 428/201; 428/214; 428/224; 428/261; 428/284; 428/286; 428/315.5; 428/411.1; 428/500; 428/913; 604/358; 156/167
[58] Field of Search ................................ 428/198, 157, 428/220, 212, 298, 411.1, 200, 201, 214, 224, 261, 284, 286, 315.5, 500, 913; 604/385.2, 358; 156/167

[56] References Cited

U.S. PATENT DOCUMENTS

| | | |
|---|---|---|
| 4,041,203 | 8/1977 | Brock et al. . |
| 4,196,245 | 4/1980 | Kitson et al. . |
| 4,374,888 | 2/1983 | Bornslaeger . |
| 4,573,986 | 3/1986 | Minetola et al. .................. 604/366 |
| 4,818,597 | 4/1989 | DaPonte et al. . |
| 4,818,600 | 4/1989 | Braun et al. . |
| 4,846,164 | 7/1989 | Martz . |
| 4,924,525 | 5/1990 | Bartasis . |
| 5,021,285 | 6/1991 | Ohe et al. . |
| 5,024,594 | 6/1991 | Athayde et al. . |
| 5,026,591 | 6/1991 | Henn et al. . |
| 5,028,375 | 7/1991 | Reifenhauser . |
| 5,032,329 | 7/1991 | Reifenhauser . |
| 5,037,411 | 8/1991 | Malcolm et al. . |
| 5,061,170 | 10/1991 | Allen et al. . |
| 5,102,484 | 4/1992 | Allen et al. . |
| 5,112,562 | 5/1992 | Mende . |
| 5,145,689 | 9/1992 | Allen et al. . |
| 5,160,746 | 11/1992 | Dodge et al. . |
| 5,236,641 | 8/1993 | Allen et al. . |
| 5,246,431 | 9/1993 | Minetola et al. .................. 604/385.2 |
| 5,260,360 | 11/1993 | Mrozinski et al. . |
| 5,269,670 | 12/1993 | Allen et al. . |
| 5,342,469 | 8/1994 | Bodford et al. . |

OTHER PUBLICATIONS

Jacobwith, J. S., "How Appropriate Are The ES 21 And ES 22 Test Methods?," Saftey & Protection Fabrics, Aug. 1993, pp. 20–25.
"Standard Test Method For Water Vapor Transmission Rate Through Plastic Film and Sheeting Using A Modulated Infrared Sensor," ASTM Committee on Standards.
Wadsworth, Larry C., et al., "Biodegradable Melt Blown Polyester Cotton–Core Laminates".
Wadsworth, Larry C., et al., "Cotton Based Laminates For Medical and Personal Hygiene Applications," Nonwoven Conference, 1994, pp. 51–72.

(List continued on next page.)

*Primary Examiner*—William A. Krynski
*Attorney, Agent, or Firm*—Amster, Rothstein & Ebenstein

[57] ABSTRACT

A composite includes a first substrate, a second substrate, a third substrate and a discontinuous adhesive structure disposed intermediate the first and second and the second and third substrates for securing the first, second and third substrates together to form a composite without significantly modifying the properties of any of the substrates. The discontinuous adhesive structure is an array of substantially linear filaments or strands of an adhesive. The composite combines high moisture vapor transmission, high resistance to penetration by liquids and high resistance to viral penetration even at a pressure of at least 3 psi, thereby rendering it suitable for medical applications such as surgical gowns, etc.

22 Claims, 5 Drawing Sheets

OTHER PUBLICATIONS

Duckett, K. E., et al., "Comparison of Layered and Homogeneously Blended Cotton and Thermally Bonding Bicomponent Fiber Webs," Nonwovens Conference, 1994, pp. 13–18.

Samuels, Sam L., "A Simplified Approach Toward Understanding the Relationships Among Fiber and Nonwoven Web Characteristcs," INJ, vol.6, No. 4 pp. 49–51.

Lickfield, Deborah K., "Medical Fabrics and Future Needs," INJ, vol. 6, No. 2, pp. 37–41.

"Patent Analysis," INJ (International Nonwoven Journal), vol. 6, No. 2, pp. 5, 17–25.

"The Challenge of Defining the Effectiveness of Protective Aseptic Barriers," INDA JNR, vol. 5, No. 2.

Leonas, Karen K., "Evaluation of Five Nonwoven Surgical gowns As Barriers to Liquid Strikethrough and Bacterial Transmission," INDA JNR, vol. 5, No. 2.

"Gore/Gallup Poll Indicates Need for Breathable Fabrics," IL, Jan. 1994.

PASS #1

PASS #2

MEDICAL COMPOSITE WITH DISCONTINUOUS ADHESIVE STRUCTURE

CROSS-REFERENCE TO RELATED APPLICATIONS

This application is a continuation-in-part of U.S. patent application Ser. No. 08/389,029 now, filed Feb. 15, 1995, which is a division of U.S. patent application Ser. No. 08/220,671, now abandoned, filed Mar. 31, 1994, which is a division of U.S. patent application Ser. No. 08/002,421, filed Jan. 8, 1993, now U.S. Pat. No. 5,342,469.

BACKGROUND OF THE INVENTION

The present invention relates to composites, and more particularly to composites including a plurality of at least three substrates and an adhesive structure disposed intermediate adjacent substrates for securing them together to form composites suitable for use in medical applications such as surgical gowns.

Unless otherwise indicated, the term "composite" as used herein and in the claims includes a first substrate, a second substrate, a third substrate and an adhesive structure disposed intermediate each pair of adjacent substrates for securing the first, second and third substrates together. In a broader sense, the term "composite" may include first, second and third substrates which are bound together directly (that is, without an intervening adhesive structure) but such materials are not to be considered part of the present invention since the substrates useful therein are typically severely limited and the techniques required in order to cause lamination or joinder of the substrates typically require a property of at least one of the substrates to be significantly modified. Such a composite may require heat, pressure or a combination thereof to be applied to the substrates in order to join them, as by applying one substrate in a hot, molten form to the other substrate or passing an assembly of the substrates through the heated nip of a pair of pressure rolls (i.e., calendering). In such cases, the heat and/or pressure tends to significantly modify the properties of at least one of the substrates—for example, converting a breathable or vapor-permeable substrate into a non-breathable or vapor-impermeable substrate. Such a calendering process limits the possible substrate combinations since all substrates should have a similar melting point in order to achieve adequate bonding without creating in the substrates heat-generated pinholes which might alter the properties thereof.

In a composite, as the term is defined above—that is, requiring in addition to the substrates an adhesive structure therebetween—there is less opportunity for one substrate to affect another substrate since the adhesive structure is disposed intermediate the two substrates and the two substrates are typically not in direct physical contact. On the other hand, the nature of the adhesive structure may itself affect the properties of either the substrates or the composite. Thus, the application of a hot melt adhesive to the substrates may cause melting of one or more substrates (since the hot melt adhesive is typically applied at temperatures of about 375° F.) or the molten adhesive may flow into small apertures or pores of one of the substrates to render it less permeable. Even where the adhesive structure itself does not significantly alter the structure of the substrates directly, it may do so indirectly by modifying the properties of the composite. For example, if two breathable or water-permeable substrates are joined by a continuous adhesive structure which is non-breathable, the adhesive structure, in effect, negates the breathability of the substrates and results in a non-breathable composite.

Commonly assigned U.S. Pat. No. 5,342,469, the substance of which is incorporated herein by reference, teaches a wo substrate composite wherein an adhesive structure is disposed intermediate a pair of substrates for securing the substrates together to form the composite without significantly modifying the properties of either substrate directly. Furthermore, the adhesive structure does not significantly modify the properties of either of the substrates indirectly— that is, it does not modify the properties of the composite from what they would be if the composite consisted exclusively of the first and second substrates. As noted in the patent, the composites formed thereby have utility as medical composites for surgical gowns and the like because of their combined breathability (that is, high moisture vapor transmission rates) and resistance to penetration by liquids (which might carry bacteria). On the other hand, these two substrate composites are not satisfactory for use in medical applications such as surgical gowns and the like where there must be not only barrier resistance to penetration by liquids (that is, bacteria infiltration), but also having resistance to penetration by viruses (especially at elevated driving force pressures such as 3 psi) without sacrificing breathability.

Accordingly, it is an object of the present invention to provide a composite suitable for medical applications, including use as a surgical gown, where barrier resistance to vital penetration is required as measured by ASTM ES-22 (modified to a pressure of at least 3 psi).

Another object is to provide such a composite which, in preferred embodiments, passes the viral barrier test at a level of at least 6 psi.

It is a further object to provide such a composite which incorporates as a fabric substitute an adhesive-free liquid-resistant three layer non-woven formed by an internal melt-blown fabric substrate disposed intermediate two spunbond fabric substrates and bonding them together.

It is also an object of the present invention to provide methods of making such composites.

SUMMARY OF THE INVENTION

It has now been found that the above and related objects of the present invention are obtained in a composite which includes the composite of aforementioned U.S. Pat. No. 5,342,469—a first substrate, second substrate, and a first discontinuous adhesive structure disposed intermediate the first and second substrates for securing them together to form the composite without significantly modifying the desired properties of either of the substrates—and additionally includes a third substrate, and a second discontinuous adhesive structure disposed intermediate the third substrate and one of the first and second substrates for securing the one substrate and the third substrate together to form the composite without significantly modifying the desired properties of either of the third substrate and the one substrate, and preferably without significantly modifying the desired properties of any of the first, second and third substrates.

Thus, a vapor permeable, liquid impermeable protective fabric composite according to the present invention comprises a fabric/film/film construct. The vapor permeable, non-woven fabric substrate is formed of a material selected from the thermoplastic polyolefin polymers, and there are at least two vapor permeable and liquid impermeable film substrates. A thermoplastic adhesive bonds the substrates together into a protective fabric composite such that the composite is characterized by passing a viral barrier test (modified ASTM ES 22) at a level of at least 3 psi and having a moisture vapor transmission rate (ASTM F 1249) of at least 2000 gm/m$^2$/24 hours.

In a preferred embodiment, the composite is non-elastic. The polyolefin polymers are ethylene, propylene and combinations thereof. The film substrate may be microporous or monolithic in structure. The fabric substrate is liquid permeable and selected from the group consisting of a spunbond, a meltblown, a spunlace, a multicomponent non-woven, and combinations thereof. The fabric substrate has a weight of 0.45–3.0 OSY and a percentage bond area of 5–45%. The fabric substrate preferably adhesive-free an adhesive-free liquid-resistant three layer non-woven formed of two spunbond fabrics and a meltblown fabric disposed intermediate the spunbond fabrics and bonding them together to form a spunbond-meltblown-spunbond non-woven fabric. The composite is characterized by passing a moisture penetration resistance test (ASTM ES 21, modified for a 2 minute hold) and, in some instances, a viral barrier test (modified ASTM ES 22) at a level of at least 6 psi.

The adhesive directly secures one surface of one film substrate to one surface of the fabric substrate and also directly secures another surface of the one film substrate to one surface of the other of said film substrates. The adhesive defines intermediate each pair of adjacent substrates an adhesive structure which is discontinuous across the width of one of the two adjacent substrates. The adhesive structure comprises an array of substantially linear, primarily unbroken and elongated filaments of adhesive of a substantially uniform diameter, the diameter being about 3 to 100 microns. The adhesive structure secures the other of the two adjacent substrates to the adhesive structure to form a portion of the composite, all without significantly modifying the desired properties of either of the two adjacent substrates.

Preferably, the adhesive is a hot melt, the filaments are substantially parallel to one another at any point along the width of the substrates, and the adhesive structure covers about 4 to 21% of each of the substrates and has a thickness about the same as the diameter of the filaments, which thickness does not vary more than plus or minus 2%. The discontinuous adhesive structure has an add-on weight of 1–23 grams per square meter.

The present invention also encompasses a method of forming a composite comprising the steps of providing first, second and third substrates and then applying to at least one of the first and second substrates and at least one of the second and third substrates a discontinuous adhesive structure and securing the adjacent substrates to the discontinuous adhesive structure to form the composite, all without significantly modifying the desired properties of either of the first, second and third substrates.

In a preferred embodiment, the discontinuous adhesive structure is applied by passing molten hot melt adhesive of suitable viscosity through a die and, before it contacts the respective substrates, cooling the adhesive below the temperature at which the desired properties of the respective substrates would be significantly modified thereby. The adhesive structure is applied at a viscosity of 50–600 poise. Optionally, a sub-assembly formed by the first, second and third substrates and the discontinuous adhesive structures therebetween is passed through a pair of nip rolls to establish uniformity of contact between the adhesive structure and the substrates. A two step process may also be used instead of the one step process.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
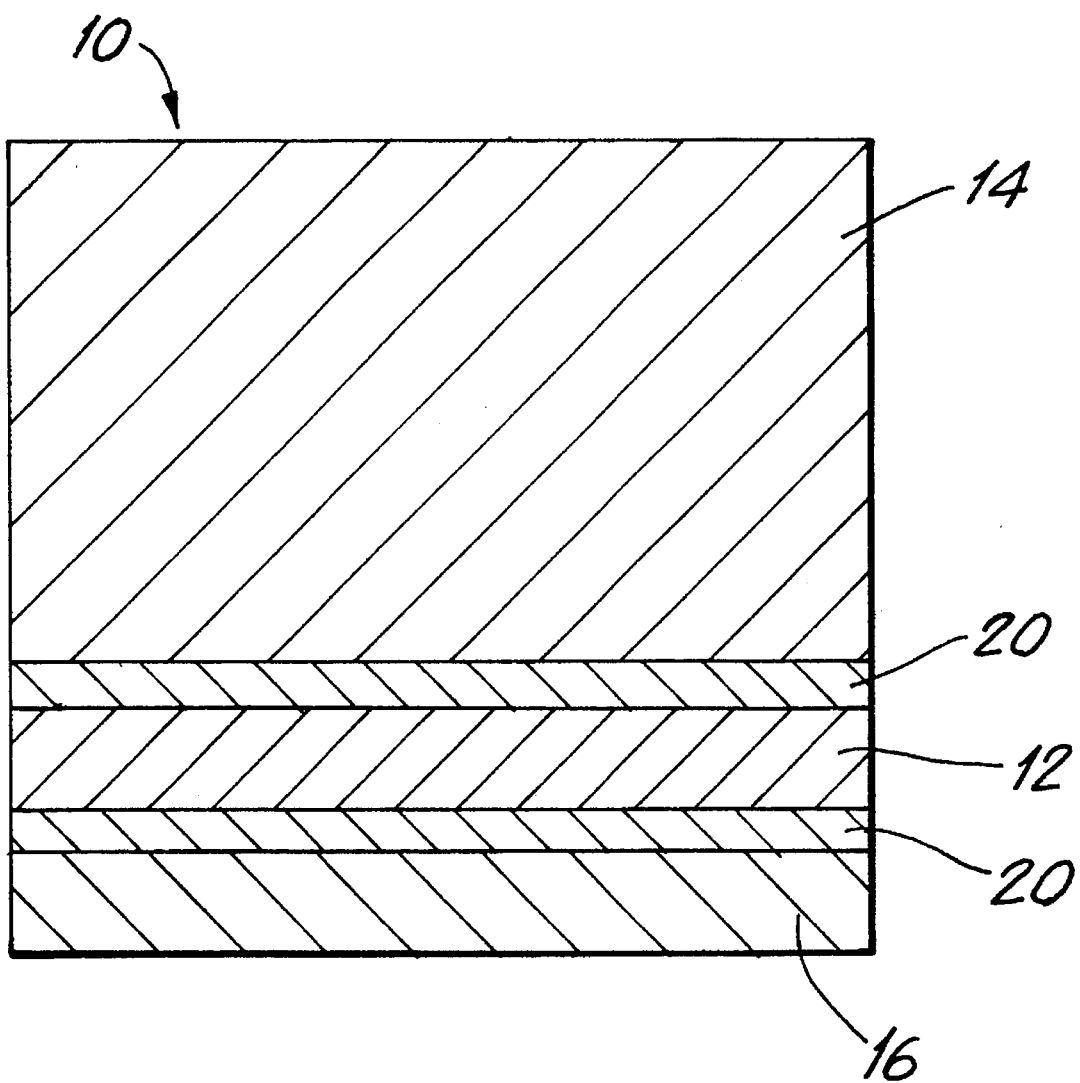
FIG. 1 is a sectional view of a composite according to the present invention.
Figure 2:
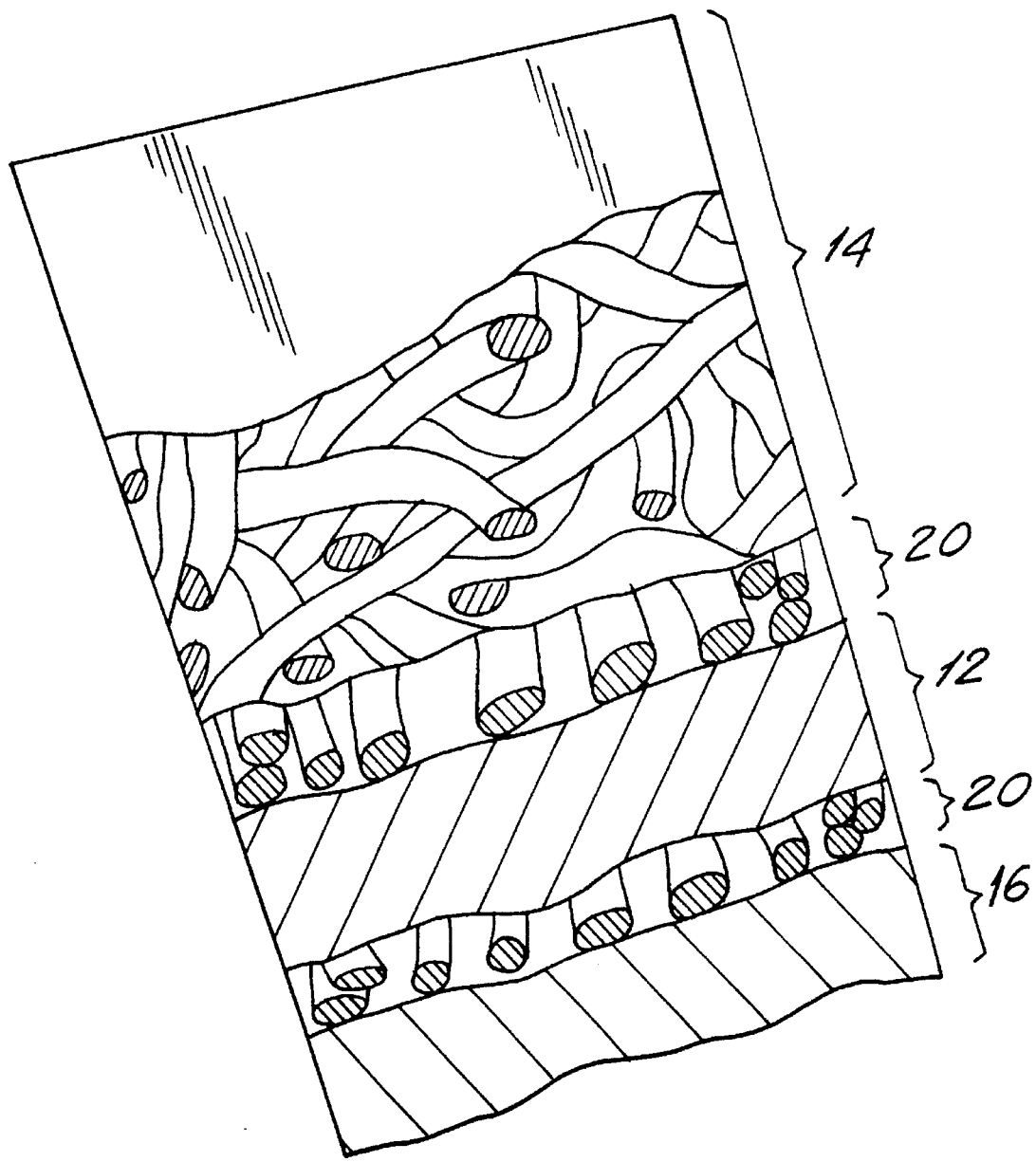
FIG. 2 is an isometric sectional view thereof.

Referring now to the drawing, and in particular to FIGS. 1 and 2 thereof, therein illustrated is a composite according to the present invention, generally designated by the reference numeral 10. The composite comprises a first substrate generally designated by the reference numeral 12, a second substrate generally designated 14, a third substrate generally designated 16, and an adhesive structure generally designated 20 and disposed both intermediate the first and second substrates 12, 14 and intermediate the second and third substrates 14, 16 for securing the substrates 12, 14, 16 together to form the composite 10. A wide variety of different materials may be employed as the first, second and third substrates 12, 14, 16 depending upon the final properties desired in the composite 10. Preferred composites 10 and the substrates 12, 14, 16 used to form them will be discussed hereinafter, it being understood that the selection of the particular substrates is not limited to the substrates specifically taught herein.

While the examples of the preferred composites provided below involve only three substrates 12, 14, 16 and the adhesive structure 20 therebetween, clearly the principles of the present invention include the use of additional substrates (such as a fourth substrate) and additional discontinuous adhesive structures (such as a third discontinuous adhesive structure disposed intermediate the fourth substrate and one of the other substrates) for securing the one substrate and the fourth substrate together to form the composite without significantly modifying the properties of any of the substrates.

A critical feature of the present invention is that the adhesive structure 20 is both discontinuous and capable of forming the composite 10 without significantly modifying the properties of any of the substrates. This is achieved by the adhesive structure 20 being formed of an array of substantially linear filaments or strands of adhesive. The substantial linear filaments are preferably 3–100 microns (optimally 5–30 microns) in diameter and are typically formed by passage through a die (for example, the die of a spinneret) so that the filaments emerge unbroken and substantially linearly (i.e., uncrossed) from the apertures of the die. Incidental transient air currents impinging upon the linear filaments before they contact a substrate may result in some overlapping of the linear filaments as they are laid down upon the substrate; accordingly, the filaments are best described as only being "substantially linear" rather than totally linear. The adhesive structure 20 may be defined by continuous filaments, non-continuous filaments or a mixture of both as the continuous filaments emerging from the die may be broken by incidental transient air currents or the like. The filaments are commonly, but not necessarily, circular cross section. Each adhesive structure 20 is of substantially uniform thickness, typically equal to the diameter of the adhesive filaments since there is essentially only a single layer of filaments intermediate a pair of adjacent substrates 12, 14 or 14, 16.

The discontinuous nature of the adhesive structure 20 ensures that the adhesive structure 20 will not significantly alter the properties of the substrates. Thus, even if the substrates are apertured, water-permeable, or vapor-permeable, the discontinuous nature of the adhesive structure 20 permits these properties of the substrates to determine the properties of the composite since the adhesive structure itself is discontinuous and hence grossly apertured.

The specifics of the adhesive structure 20 will vary with the intended application of the composite and the properties desired therein. Thus, the adhesives useful in the present invention include styrene-isoprene-styrene block co-polymers (SIS), styrene-ethylene-butylene-styrene block co-polymers (SEBS), styrene-butadiene-styrene co-polymers (SBS), ethylene vinylacetate (EVA) and EVA co-polymers, atactic polypropylene (APP), atactic polyalphaolefins (APAO), VESTOPLAST (trademark of Huls America), adhesive-containing KRATON (trademark of Shell Chemical), as well as various combinations of the above-mentioned polymers varying in molecular weight and plasticizer content. In selecting the most appropriate material for the adhesive structure 20, consideration may be given to such characteristics as bond strength, ultra-violet light stability, gamma stability, odor, tack, and the like. The adhesives may be pressure-sensitive or non-pressure-sensitive, as desired. The discontinuous adhesive structure is typically applied at an add-on weight of 1–23 grams per square meter of substrate.

Preferred hot melt adhesives include grade HL-1280 or HL-1440X (supplied by H. B. Fuller Company, St. Paul, Minn.), and H-2176-01 (supplied by Findley Adhesives, Wauwatosa, Wis.). H-2161 (supplied by Findley Adhesives) is especially preferred. The various parameters of the process conditions will depend, at least in part, upon the particular adhesive used. Thus, the pre-melt, main melt, transfer hose, die and air temperatures may vary with the adhesive, typical temperatures ranging from 280°–375° F. The pre-melt temperature and main melt temperatures are the temperatures of the adhesive in the hot melt adhesive tank. The transfer temperature is the temperature of the transfer hose through which adhesive is moved from the melt tank to the die assembly. The die temperature is the temperature of the die assembly, and the air temperature is the temperature of the air dispensed from the die assembly. The adhesive strands will be prepared at a suitable rate for dispensation by air or like gas (at a heated temperature) over the surface width of the substrate.

Figure 4:
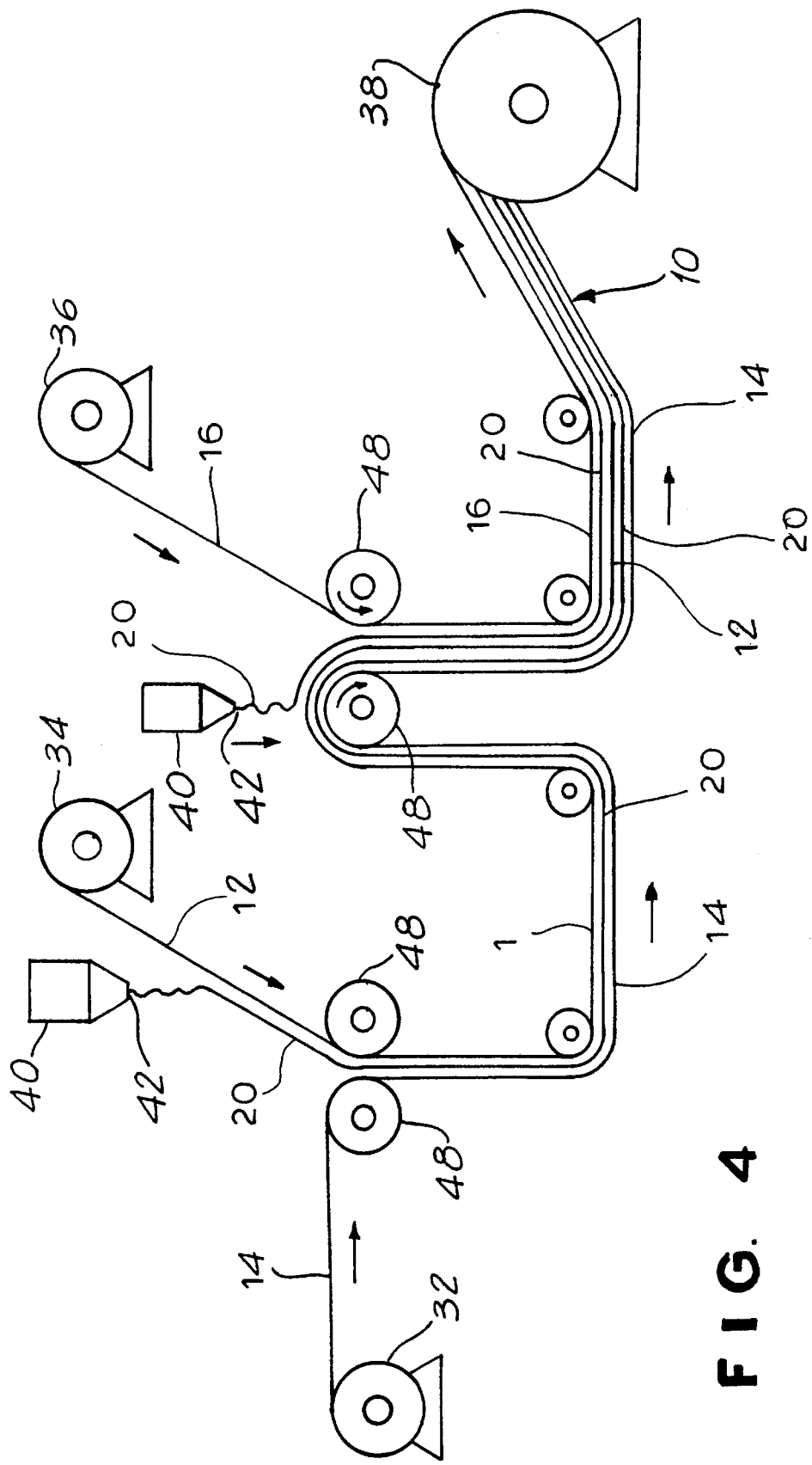
FIG. 4 is a schematic view of a process for making the composite according to the present invention on a generally horizontal production line in one pass.

Referring now to FIG. 4, therein illustrated schematically is a two-pass process according to the present invention for making the composite 10 on a generally horizontally oriented production line. The first substrate 12 is supplied from a first substrate supply roll 32, the second substrate 14 is supplied from a second substrate supply roll 34, and the third substrate 16 is supplied from a third substrate supply roll 36. All substrates 12, 14, 16 are drawn by a take-up roll 38 where the composite 10 is rolled and stored for future use. Two die assemblies 40, each having a die 42 composed of a plurality of tiny apertures, are loaded with a quantity of the adhesive 20 under pressure.

Preferably, the adhesive is a molten adhesive (e.g., a hot melt adhesive) and the die assembly 40 is heated to maintain the adhesive at a temperature which provides the appropriate viscosity for passage of the molten adhesive through the die apertures under the influence of air pressure (e.g., about 375° F. for a 6–8 cfm air flow). The molten adhesive is, in effect, extruded through the die apertures of die 42 in the molten state, but is allowed to cool before it contacts the first of the substrates (preferably, as here illustrated, the non-woven substrate 14) to a temperature (e.g., about 100°–125° F.) such that it does not significantly modify the desired properties of that first-contacted substrate 14. By the time the adhesive contacts the film substrates 12 or 16, it should be below the temperature at which the adhesive can significantly modify the desired properties of that other substrate. Where the adhesive is brought into contact with all substrates 12, 14, 16 substantially simultaneously, then the adhesive must be cooled before it contacts either substrate, to a temperature at which it will not significantly modify the properties of any substrate 12, 14, 16. Preferably the adhesive structure is allowed to cool so that it has a viscosity of about 50–600 poise immediately prior to contacting the first substrate.

The adhesive filaments or strands emitted from the die apertures of die 42 are preferably allowed to cool naturally (i.e., through heat dissipation to ambient or warm air over the time required for the filaments to reach the substrates) although positive cooling of the filaments may be effected, for example, by an impinging stream of relatively cool air. Any positive cooling of the filaments should be conducted at sufficiently low air velocities that the filaments remain substantially linear with only minimal overlapping and crossing. In order to provide sufficient time for natural or unassisted cooling, the distance between the die head and the web (known as the "die assembly height") is preferably about 1.5–6.0 inches, and optimally about 2.25 inches, so that the adhesive has an opportunity to naturally cool sufficiently before it strikes the web. A lesser spacing may be adequate where positive cooling is used.

The adhesive is typically applied to the web at an angle of about 90°, although this angle may be varied as desired for particular applications. The resultant fabric bond area (i.e., the percentage of the area of each substrate covered by the adhesive) may vary substantially and is preferably from about 4 to 21%.

The adhesive used for the adhesive structure 20 has sufficient tack that, at least with applied pressure, it will bond adequately with the two adjacent substrates. Preferably, but not necessarily, the sub-assembly formed by the adjacent substrates and the discontinuous adhesive structure 20 therebetween is passed through a pair of unheated nip rolls 48 (e.g., the nip rolls of a cooled calendar) to establish uniformity of contact between the adhesive structures 20 and the adjacent substrates 12, 14 and 12, 16 as illustrated in FIG. 4. The nip rolls 48 may be rubber-coated, coarse or smooth plasma-coated, Teflon-coated or the like and may be cooled by circulating water or refrigerant. In order to assist adequate cooling of the adhesive structure 20 before passage through the cool nip rolls 48, the separation or distance from the die (actually the point on the web which first receives the adhesive) to the nip along the length of the sub-assembly is appropriately selected for the web speed, the die-to-nip distance increasing with increasing web speed.

It will be appreciated that the application of the adhesive structure to the substrates described above does not significantly modify the desired properties of the substrates. By way of contrast, application of an adhesive through conventional rotogravure techniques tends to produce sheets or relatively large globs of adhesive, while application of an adhesive through conventional blowing of the adhesive onto a substrate tends to produce wide variations in the thickness of the adhesive structure produced. In contrast, the method of the present invention enables the adhesive structure 20 to be formed with variations of thickness across the width of the substrates of as little as plus or minus 2%. Accordingly, the present invention provides a thin and uniform adhesive structure, typically about as thick as the adhesive filament diameter. Since the adhesive structure 20 is at a temperature of only about 100°–125° F. at the time of contact with the substrate, any of a wide variety of substrates may be used to form a composite according to the present invention. Where the porous or permeable structure of a substrate is to be maintained, the substrate need only have a melting point higher than that of the adhesive structure contacting the same (namely, typically about 100°–125° F.).

Figure 3A:
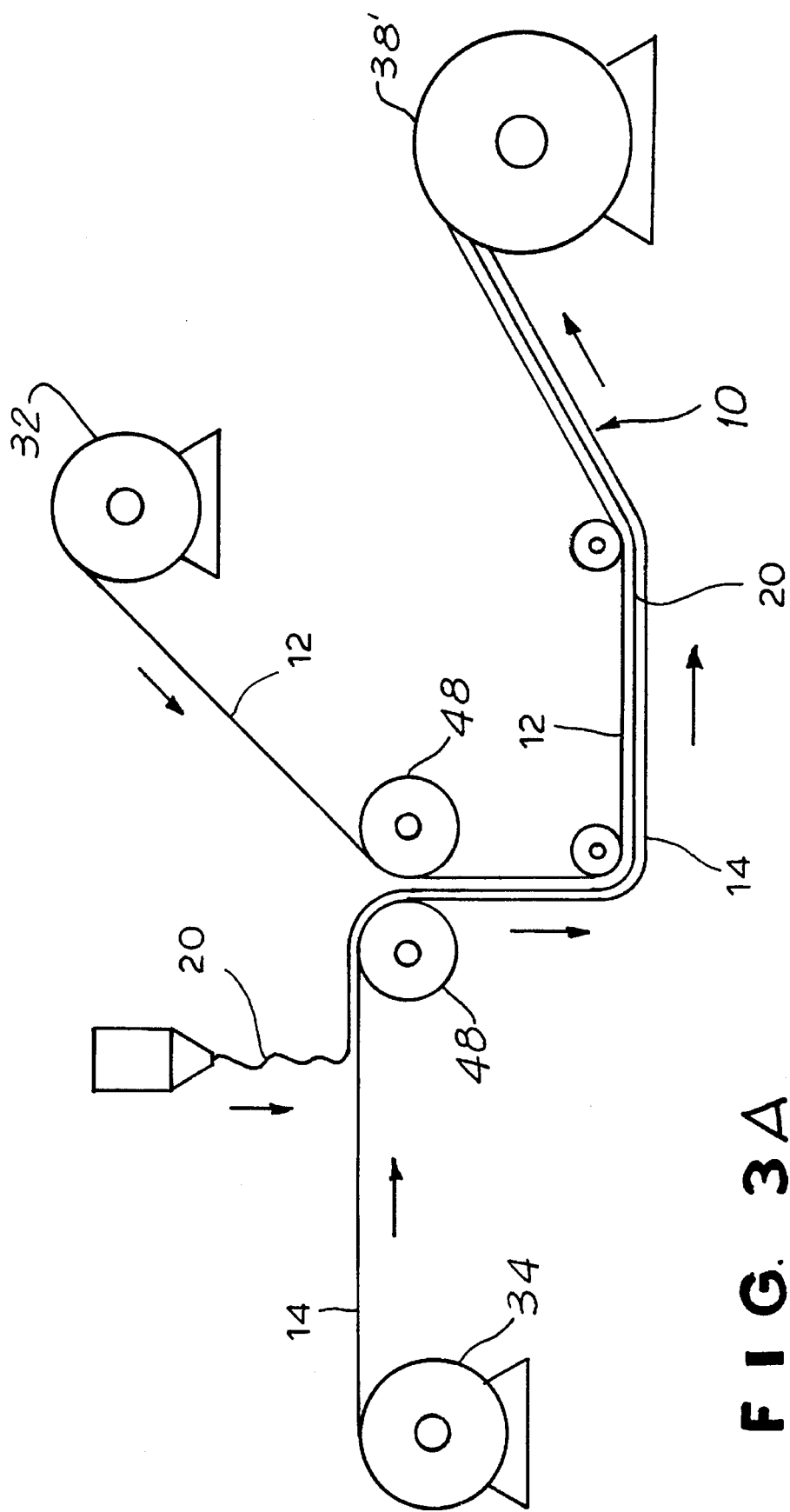
FIGS. 3A and 3B are a schematic view of a process for making the composite according to the present invention on a generally horizontal production line in two passes.
Figure 3B:
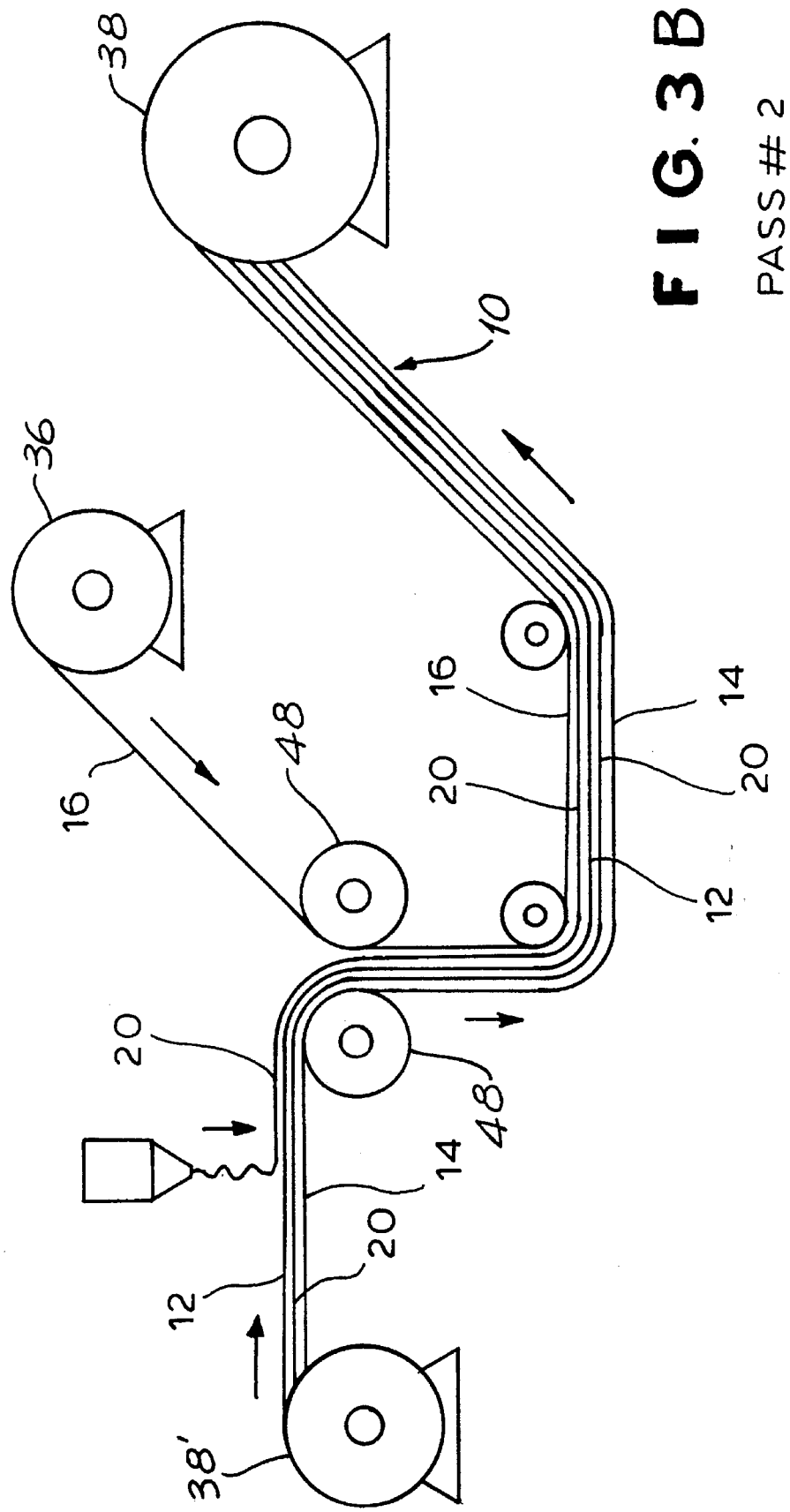

Referring now to FIGS. 3A and 3B, therein illustrated schematically is another production line for the manufacture of the composite 10 according to the present invention, this production line differing from the production line of FIG. 4 because production is done in two passes rather than one pass. Elements of the production line of FIG. 3 having the same structure and function as the production line of FIG. 4 are similarly numbered. In the first pass illustrated in FIG. 3A, an intermediate roll 38 draws the bilaminate 14, 20, 12 through the system, and in the second pass illustrated in FIG. 3B the intermediate roll 38' serves as input to the take-up roll 38' which draws the trilaminate composite 14, 20, 12, 20, 16 through the second pass. The two pass embodiment illustrated in FIGS. 3A and 3B has the disadvantage of requiring the use of an intermediate roll 38, but enables the process to be performed using only a single pair of nip rolls 48 (rather than 2 pairs of nip rolls 48 as illustrated the one-step process of FIG. 4).

A preferred embodiment of the composite 10 has fluid barrier properties useful in medical and industrial protective garments such as surgical gowns, disposable protective garments, etc. The composite 10 employs a liquid-permeable non-woven web as the substrate 14 (typically as the inner layer to provide a comfortable feel to the wearer's body), a breathable or vapor-permeable, non-liquid permeable film as the substrates 12, 16 (typically as the middle and the outer or exposed surfaces), and a hot melt adhesive as the adhesive structure 20 joining each pair of adjacent substrates 12, 14 and 12, 16.

More particularly, the web substrate 14 is preferably a spunbonded polyethylene web having a 3–40 mils thickness corresponding to a basis weight of about 0.3–3.5 oz./sq. yard (osy), and optimally 1.0 oz./sq. yard. Preferred non-woven webs of the composite 10 are spunbonded, carded, spun-laced, melt-blown or the like. The web may be treated to dissipate static charges as necessary for anti-static properties desirable in protective clothing. A chemical finish may be applied to the web surface in order to repel specific fluids. The spunbonded web may have an embossed area covering, for example, 14%–21% of the surface of the web. A fiber denier of 2.5–6 is preferred because it offers high strength and flexibility. While the resultant web typically feels soft, pliable and comfortable, the textile-like feel or hand may be enhanced by the use of spun-laced non-wovens. Alternatively, the web substrate is preferably a spunbonded polypropylene web optimally having a basis weight of 1.5 osy.

For the purposes of the present invention, an especially preferred liquid-permeable non-woven web useful as the web substrate 14 is a spunbond-meltblown-spunbond nonwoven fabric. The spunbond-meltblown-spunbond is an adhesive-free, liquid resistant, three layer, fabric substrate formed of two spunbond fabrics and one melt-blown fabric disposed intermediate the spunbond fabrics and bonding them together. Relative to conventional spunbond substrates, offers high strength, combined with softness, pliability and comfort, with enhanced textile-like feel or hand.

The film substrates 12, 16 are preferably thermoplastic films of microporous structure having a 1.0–1.5 mil thickness. Preferred films of the composite 10 are either a linear, low-density polyethylene or a polypropylene-based film. The pore or void content in the breathable film is preferably 25–50%, with a preferred void content of about 40%, although other void contents may be useful for specific applications. The pore size and content can be varied depending upon the amount of moisture vapor transmission desired through the film. For a pore content of 25–50% and a pore size not in excess of 15 microns, moisture vapor transmission rates of 5,000–11,000 gm/m$^2$/24 hours (at 100° F., 100% relative humidity) are obtainable. Corona charging of the film may be used to modify its surface tension, either to improve its adhesion properties or its fluid repellent properties. Additionally, such corona charging enhances printability of the structure where printing of designs and logos on the composite is desired. The film may also be one of the commercially available products which are permeable to water vapor but impermeable to liquid water (e.g., a polyethylene microporous product available under the trade name EXXAIRE from Exxon), or breathable but monolithic (e.g., a copolyester film, 1.0 mil thick (available under the trade name HYTREL from DuPont de Nemours, Wilmington, Del.).

The filamentary hot melt adhesive layer 20 may be sprayed directly onto the substrates 12, 14, 16 using any one of the commercially available systems for continuous spraying of a uniform layer of hot melt adhesive (such as those available from May Coating Technologies, Inc., White Bear Lake, Minn. and J&M Laboratories, Dawsonville, Ga. Preferably layer 20 is initially sprayed directly onto the non-woven substrate 14, and is then sprayed directly onto the film substrate 12, 16 already laminated to (and thereby supported by) the non-woven 14.

In the composite 10 thus formed, the spunbonded layer 14 provides strength and dimensional stability as well as softness (hand) and other textile-like properties. The adhesive structure 20 adheres substrates 12, 14, 16 together, the small adhesive filament or strand diameter and its uniform distribution preventing the overall composite from becoming stiff, losing its textile-like hand, or having an uneven thickness. While the spunbonded web 14 is permeable to both liquid water and water vapor, the film substrates 12, 16 are impermeable to liquid water and prevent strikethrough of potentially harmful liquids while still enabling the transmission of water vapor (e.g., sweat) through a garment made thereof to enhance user comfort.

In a related composite 10, at least one of the breathable, vapor-permeable film substrates 12, 16 is replaced with a non-breathable, vapor-impermeable film substrate. This composite provides a total barrier construction and is therefore useful in garments to be used in extremely hazardous applications (such as asbestos removal or to prevent strikethrough of blood contaminated with liquid-borne pathogens), albeit with some reduction in user comfort since wearer sweat cannot evaporate therethrough. The total barrier laminate can be used for construction of either the entire garment or merely discretely placed zones of the garment (e.g., forearms and chest).

In still other composites 10, the breathability or barrier properties of the composite may be of no concern, the advantages of the composite arising out of one or more of its other properties—e.g., softness (hand), strength, dimensional stability, absorptiveness, etc.

EXAMPLE 1

Film A:

A 1.0 mil thick polyethylene film of microporous structure (supplied by Exxon Chemical Company, Lake Zurich, Ill.).

Web:

A non-woven spunbonded polypropylene web weighing about 1.0 osy, thermally bonded, having an embossed area of approximately 21% over the surface of the web, and a fiber denier of 2.5 denier.

Film B:

Same as Film A.

Using the equipment shown in FIG. 3, the web, film A, and film B substrates were bonded together using hot melt adhesive H-2161 (supplied by Findley Adhesives, Wauwatosa, Wis.). The web and film A were bonded together at an add-on of 9 grams per square meter, and film A of the resultant composite structure was subsequently bonded in a second pass to film B under the same process conditions, to form a Web/Film A/Film B composite. The process was adjusted for low heat and low nip pressure to ensure the absence of pinholes in the substrates. The process conditions were as set forth in TABLE I.

The resultant composite fabric showed excellent moisture vapor transmission rates and enhanced resistance to viral penetration at high pressures in a modified ASTM ES 22 Test (to at least 3 psi). The physical properties of the composite are listed in TABLE II.

EXAMPLE 2

Film A:

A 1.5 mil thick polyethylene film of microporous structure (supplied by Exxon Chemical Company). Similar films described in U.S. Pat. Nos. 4,846,164, 5,024,594, and 5,260,360, can also be used as substrates.

Web:

A non-woven spunbonded polyethylene web, weighing about 1.0 osy, thermally bonded, having an embossed area of approximately 21% over the surface of the web and a fiber denier of 3 denier.

Film B:

Same as Film A.

Using the equipment shown in FIG. 3 and the procedure of EXAMPLE 1, the web, film A, and film B substrates were bonded together using hot melt adhesive H-2161 at an add-on of 9 grams per square meter, to form a Web/Film A/Film B composite.

The resultant composite fabric showed excellent moisture vapor transmission rates and enhanced resistance to viral penetration at high pressures in a modified ASTM ES 22 Test (to at least 3 psi).

As the polyolefin films A and B (as well as the web) are polyethylene, the entire composite structure shows an inherent suitability for withstanding gamma radiation sterilization, a property which is not applicable to polypropylene-based structures.

EXAMPLE 3

Film A:

A 1.5 mil thick polyethylene film of microporous structure (supplied by Exxon Chemical Company).

Web: A non-woven spunbonded polypropylene web, weighing about 1 osy, thermally bonded, having an embossed area of approximately 21% over the surface of the web, and a fiber denier of 3 denier. Similar non-woven spunbonded webs described in U.S. Pat. Nos. 5,032,329; 5,028,375; and 5,112,562, can also be used as substrates.

Film B:

A 1.0 mil thick polyethylene film of microporous structure (supplied by Exxon Chemical Company).

Using the equipment shown in FIG. 3 and the procedure of EXAMPLE 1, the web, film A, and film B substrates were bonded together using hot melt adhesive H-2161 at an add-on weight of 9 grams per square meter to form a Web/Film A/Film B composite.

The resultant composite fabric showed excellent moisture vapor transmission rates and enhanced resistance to viral penetration at high pressures in a modified ASTM ES 22 Test, consistently passing the test at a pressure of over 6 psi. The physical properties of the composite are listed in TABLE II.

EXAMPLE 4

Film A:

A 1.0 mil thick polyethylene film of microporous structure (supplied by Exxon Chemical Company).

Web:

A non-woven spunbond-meltblown-spunbond fabric web weighing about 1.0 osy, thermally bonded, having an embossed area of approximately 21% over the surface of the web, and a fiber denier of 2.5 denier for the spunbond fibers and about 10 microns for the meltblown fibers.

Film B:

Same as Film A.

Using the equipment shown in FIG. 3 and the procedure of EXAMPLE 1, the web, film A, and film B substrates are bonded together using hot melt adhesive H-2161 (supplied by Findley Adhesives, Wauwatosa, Wis.). The web and film A are bonded together at an add-on of 6 grams per square meter, and film A of the resultant composite structure is subsequently bonded to film B under the same process conditions, to form a Web/Film A/Film B composite. The process is adjusted for low heat and low nip pressure to ensure the absence of pinholes in the substrates.

The resultant composite fabric shows excellent moisture vapor transmission rates and enhanced resistance to viral penetration at high pressures in a modified ASTM ES 22 Test (modified for at least 3 psi). The spunbond-meltblown-spunbond web (relative to a spunbond or meltblown web) affords enhanced barrier properties to the composite without adversely affecting moisture vapor transmission rates significantly.

The resultant material is optionally treated to provide antistatic and hydrophobic properties.

EXAMPLE 5

Film A:

A 1.0 mil thick copolyester film of monolithic breathable structure (supplied under the trade name HYTREL by Du Pont de Nemours & Co., Wilmington, Del.).

Web:

A non-woven spunbond-meltblown-spunbond web weighing about 1.0 osy, thermally bonded, having an embossed area of approximately 21% over the surface of the web, and a fiber denier of 3 denier of spunbond fibers and about 5 microns of meltblown fibers.

Film B:

Same as Film A.

Using the two-pass equipment shown in FIG. 3 and the procedure of EXAMPLE 1, the web, film A, and film B substrates are bonded together using hot melt adhesive H-2161 (supplied by Findley Adhesives, Wauwatosa, Wis.). The web and film A are bonded together at an add-on of 6 grams per square meter, and film A of the resultant composite structure is subsequently bonded to film B under the same process conditions, to form a Web/Film A/Film B composite. The process is adjusted for low heat and low nip pressure to ensure the absence of pinholes in the substrates.

The resultant composite fabric shows excellent moisture vapor transmission rates and enhanced resistance to viral penetration at high pressures in a modified ASTM ES 22 Test (modified for at least 3 psi). The spunbond-meltblown-spunbond web (relative to a spunbond or meltblown web) affords enhanced barrier properties to the composite without adversely affecting moisture vapor transmission rates significantly.

The resultant material is optionally treated to provide antistatic and hydrophobic properties.

In EXAMPLES 1–3, the film/web structure was strengthened by adding an additional layer of film to produce a web/film/film structure, with the resulting composite fabric combining excellent moisture vapor transmission rates and enhanced resistance to viral penetration at high pressures of at least 3 psi and, in the case of EXAMPLE 3, of at least 6 psi. Depending upon the nature of the materials employed, the fabric may (polyethylene) or may not (polypropylene) be suitable for gamma radiation sterilization.

In EXAMPLES 4–5, the web/film/film structure is further strengthened by the use of a spunbond-meltblown-spunbond non-woven fabric as the web, which fabric provides external layers of spunbond fabric heat laminated to an internal layer of meltblown fabric. Again, the resulting fabric combines excellent moisture vapor transmission rates and enhanced resistance to viral penetration at high pressures of at least 3 psi.

EXAMPLES 1–5 illustrate the efficacy of the present invention for the manufacture of medical fabrics where there is a need not only for precluding passage of bacteria therethrough (bacteria generally requiring a liquid medium for transmission), but for precluding passage of viruses therethrough as well (viruses typically not requiring a liquid medium for transmission). Even more importantly, whereas the current test for resistance to viral penetration (ASTM ES 22) utilizes only a pressure of 2 psi as the driving force urging the virus through the fabric, EXAMPLES 1–5 teach fabrics which pass the exact same test even when the pressure or driving force is increased to at least 3 psi and, in the case of EXAMPLE 3, to at least 6 psi.

TABLE I

PROCESS CONDITIONS
Examples 1–3

| | |
|---|---|
| Pre-Melt T, °F. | 315 |
| Main Melt T, °F. | 320 |
| Hose T, °F. | 320 |
| Die T, °F. | 325 |
| Air T, °F. | 330 |
| Adhesive Output, gsm* | 9 |
| Web Speed, fpm | 350 |

*Applied at an adhesive application angle of 90°, with a die assembly height of 2.25 inches and a die-to-nip distance of 4 inches.

TABLE II

PHYSICAL PROPERTIES OF THE COMPOSITE
EXAMPLES 1 AND 3

| Composite Physical Property | Test Method | Composite | | Standard Deviation | |
|---|---|---|---|---|---|
| | | Ex. 1 | Ex. 3 | Ex. 1 | Ex. 3 |
| Weight (oz/yd$^2$) | ASTM D-1910 | 2.65 | 2.92 | 0.15 | 0.09 |
| Thickness (mils) | ASTM-1777-64 | 13.53 | 13.2 | 0.96 | 0.85 |
| Tensile Strength (lbs/in$^2$) MD | ASTM D-1682 | 6.37 | 7.09 | 0.37 | 1.36 |
| Tensile Strength (lbs/in$^2$) CD | Strip Tensile Strength | 12.1 | 13.32 | 0.48 | 0.47 |
| Trapezoid Tear Strength (lbs) MD | ASTM D-2263 | 6.37 | 8.48 | 0.75 | 1.5 |
| Trapezoid Tear Strength (lbs) CD | ASTM D-2263 | 6.85 | 8.77 | 1.43 | 1.21 |

TABLE II-continued
PHYSICAL PROPERTIES OF THE COMPOSITE EXAMPLES 1 AND 3

| Composite Physical Property | Test Method | Composite | | Standard Deviation | |
|---|---|---|---|---|---|
| | | Ex. 1 | Ex. 3 | Ex. 1 | Ex. 3 |
| Ball Burst Strength | ASTM D-3787-80A | 31.27 | 34.06 | 2.39 | 2.04 |
| Bond Strength (lbs) MD | INDA STANDARD TEST 110-2-82 | 1.74 | 2.72 | 0.38 | 0.73 |
| Bond Strength (lbs) CD | INDA STANDARD TEST 110-2-82 | 1.89 | 2.51 | 0.41/0.60 | |
| Moisture Vapor Transmission Rate (gm/m$^2$/24 hrs) | ASTM F-1249 | >3000 | >3000 | | |
| Resistance to Penetration by Liquids (2 psi) | ASTM ES-21 (Modified for 2 minute hold) | Pass | Pass | | |

The comparative results for breathability of the film vis-a-vis the composite clearly show that the breathability of the composite was substantially equal to that of the films alone.

The test methods used in the examples were as follows:

Water or Moisture Vapor Transmission Rate (WVTR or MVTR) Through Plastic Film and Sheeting: ASTM F 1249-90 Using a Modulated Infrared Sensor.

Liquid Penetration Resistance: ASTM ES 21, modified to reduce the hold time from 55 minutes to 2 minutes.

Viral Penetration Resistance: ASTM ES 22, modified for a higher pressure of at least 3 psi unless otherwise stated.

Gurley Porosity: ASTM D726, Method A

Thickness: ASTM D1777

Weight: ASTM D1910

To summarize, the present invention provides a web/film/film composite wherein an adhesive structure is disposed intermediate adjacent pairs of at least three substrates to secure the substrates together to form the composite without significantly modifying the properties of any substrate either directly or indirectly (that is, by modifying the properties of the composite from what they would be if the composite consisted exclusively of the substrates). The present invention also provides a method of forming such a composite. In a preferred embodiment, the composite has excellent water vapor transmission rates, but has a high viral penetration resistance even at 3 psi, as noted by modified ASTM ES22 tests.

Now that the preferred embodiments of the present invention have been shown and described in detail, various modifications and improvements thereon will readily become apparent to those skilled in the art. Accordingly, the spirit and scope of the present invention is to be construed broadly and limited only by the appended claims, and not by the foregoing specification.

We claim:

1. A vapor permeable, liquid impermeable protective fabric composite comprising:

(A) a vapor permeable, non-woven fabric substrate formed of a material selected from the thermoplastic polyolefin polymers;

(B) at least two vapor permeable and liquid impermeable film substrates; and (C) a thermoplastic adhesive bonding said substrates together into a protective fabric/film/film composite;
   said fabric substrate having a weight of 0.43–3.0 OSY and percentage bond area of 5–45%;
   said composite being characterized by passing a viral barrier test (modified ASTm ES 22) at a level of at least 3 psi and having a moisture vapor transmission rate (ASTM F 1249) of at least 2000 gm/m$^2$/24 hours.

2. The composite of claim 1 wherein said polyolefin polymers are ethylene, propylene and combinations thereof.

3. The composite of claim 1, wherein said fabric substrate is selected from the group consisting of a spunbond, a meltblown, a spunlace, a multicomponent non-woven, and combinations thereof.

4. The composite of claim 1 further characterized by passing a viral barrier test (modified ASTM ES 22) at a level of at least 6 psi.

5. The composite of claim 1 further characterized by passing a moisture penetration resistance test (ASTM ES 21, modified for a 2 minute hold).

6. The composite of claim 1 wherein said adhesive directly secures one surface of one of said film substrates to one surface of said fabric substrate and also directly secures an opposite surface of said one film substrate to one surface of the other of said film substrates.

7. The composite of claim 1 wherein said film substrate is microporous.

8. The composite of claim 1 wherein said film substrate is monolithic.

9. The composite of claim 1 wherein said fabric substrate is an adhesive-free liquid-resistant three layer spunbond-meltblown-spunbond non-woven formed of two spunbond fabrics and a meltblown fabric disposed intermediate said spunbond fabrics and bonding them together.

10. The composite of claim 1 wherein said adhesive defines intermediate each pair of adjacent substrates an adhesive structure which is discontinuous across the width of one of said two adjacent substrates, the adhesive structure comprising an array of substantially linear, primarily unbroken and elongated filaments of adhesive of a substantially uniform diameter, the adhesive structure securing the other of said two adjacent substrates to the adhesive structure to form a portion of said composite, all without significantly modifying the desired properties of either of said two adjacent substrates.

11. The composite of claim 10 wherein the adhesive structure has a thickness which does not vary more than plus or minus 2%.

12. The composite of claim 10 wherein said adhesive is a hot melt.

13. The composite of claim 10 wherein said filaments are substantially parallel to one another at any point along the width of said substrates.

14. The composite of claim 10 wherein said adhesive structure covers about 4 to 21% of each of said substrates.

15. The composite of claim 10 wherein said adhesive structure has a thickness about the same as the diameter of said filaments.

16. The composite of claim 10 wherein said adhesive is a hot melt, said filaments are substantially parallel to one another at any point along the width of said substrates, and said adhesive structure covers about 4 to 21% of each of said substrates and has a thickness about the same as the diameter of said filaments, which thickness does not vary more than plus or minus 2%.

17. The composite of claim 1 wherein said fabric substrate is liquid permeable.

18. A vapor permeable, liquid impermeable protective fabric composite comprising:

(A) a vapor permeable, liquid permeable non-woven fabric substrate formed of a material selected from the thermoplastic polyolefin polymers of ethylene, propylene and combinations thereof, said fabric substrate being selected from the group consisting of a spunbond, a meltblown, a spunlace, a multicomponent non-woven, and combinations thereof, said fabric substrate having a weight of 0.45–3.0 OSY and a percentage bond area of 5–45%;

(B) at least two vapor permeable and liquid impermeable film substrates; and (C) a thermoplastic adhesive bonding said substrates together into a protective fabric composite, said adhesive directly securing said at least two film substrates in turn on one side of said fabric substrate;

said adhesive defining intermediate each adjacent two of said substrates an adhesive structure which is discontinuous across the width of one of said two substrates, the adhesive structure comprising an array of substantially linear, primarily unbroken and elongated filaments of adhesive of a substantially uniform diameter, said diameter being about 3 to 100 microns, the adhesive structure securing said two substrates to the adhesive structure to form said composite, all without significantly modifying the desired properties of either of said two substrates, said adhesive being a hot melt, said filaments being substantially parallel to one another at any point along the width of said substrates, and said adhesive structure covering about 4 to 21% of each of said substrates and having a thickness about the same as the diameter of said filaments, which thickness does not vary more than plus or minus 2%, said composite being characterized by passing a viral barrier test (modified ASTM ES 22) at a level of at least 3 psi and a moisture penetration resistance test (modified ASTM ES 21 for a 2 minute hold) and having a moisture vapor transmission rate (ASTM F 1249) of at least 2000 gm/m$^2$/24 hrs.

19. The composite of claim 18 wherein said film substrate is microporous or monolithic.

20. The composite of claim 18 wherein said fabric substrate is an adhesive-free liquid-resistant three layer spunbond-meltblown-spunbond non-woven formed of two spunbond fabrics and a meltblown fabric disposed intermediate said spunbond fabrics and bonding them together.

21. The composite of claim 10 wherein said substantially uniform diameter of said filaments of adhesive is about 3–100 microns.

22. The composite of claim 1 wherein said adhesive defines an adhesive structure which is discontinuous and forms said composite.

* * * * *